United States Patent
Shimojo et al.

(10) Patent No.: US 10,417,744 B2
(45) Date of Patent: Sep. 17, 2019

(54) VIDEO DISTRIBUTION DEVICE, VIDEO DISTRIBUTION SYSTEM, VIDEO DISTRIBUTION METHOD, AND VIDEO DISTRIBUTION PROGRAM

(71) Applicant: Amatelus Inc., Tokyo (JP)

(72) Inventors: Shinya Shimojo, Tokyo (JP); Mitsuhide Matsuda, Tokyo (JP)

(73) Assignee: Amatelus Inc., Tokyo (JP)

( * ) Notice: Subject to any disclaimer, the term of this patent is extended or adjusted under 35 U.S.C. 154(b) by 0 days.

(21) Appl. No.: 15/964,700

(22) Filed: Apr. 27, 2018

(65) Prior Publication Data

US 2019/0087936 A1    Mar. 21, 2019

(30) Foreign Application Priority Data

Sep. 20, 2017   (JP) ................................ 2017-180411

(51) Int. Cl.
  *G06T 3/40*      (2006.01)
  *G06T 7/20*      (2017.01)
  (Continued)

(52) U.S. Cl.
  CPC ............ *G06T 3/4038* (2013.01); *G06F 16/40* (2019.01); *G06T 7/20* (2013.01);
  (Continued)

(58) Field of Classification Search
  CPC .. H04N 7/181; H04N 5/23206; G06F 3/0485; G09B 5/065; G09G 5/12; G09G 5/34;
  (Continued)

(56) References Cited

U.S. PATENT DOCUMENTS 6,233,428 B1 * 5/2001 Fryer ...................... G09B 5/02
                                              434/308
7,113,971 B1 * 9/2006 Ohi ..................... H04N 5/23206
                                              348/211.3
(Continued)

FOREIGN PATENT DOCUMENTS

JP       2004-53616 A    2/2004
JP       2015-177394 A   10/2015
(Continued)

OTHER PUBLICATIONS

Rejection Notice dated Jun. 12, 2018, from corresponding Japanese Patent Application No. 2017-180411 along with an English translation.
(Continued)

*Primary Examiner* — Thai Q Tran
*Assistant Examiner* — Syed Y Hasan
(74) *Attorney, Agent, or Firm* — DLA Piper LLP (US)

(57) ABSTRACT

A video distribution device includes: an acquisition unit for acquiring multiple videos of the same object shot from different angles; a storage unit for associating a still image for a predetermined duration of time extracted from each of the multiple videos with information indicating an angle at which the corresponding video is shot, and storing the associated still image in a chronological order; a reception unit for receiving an angle for viewing the object designated via an information processing terminal; and a control unit for performing a control in which each time the reception unit receives the designated angle, a still image corresponding to the angle is obtained from the storage unit, and the still image corresponding to the angle is transmitted to the information processing terminal in the chronological order where the still image is stored.

2 Claims, 2 Drawing Sheets

(51) Int. Cl.
*G06F 16/40* (2019.01)
*G08B 13/196* (2006.01)
*G09B 5/06* (2006.01)
*H04N 7/18* (2006.01)

(52) U.S. Cl.
CPC .............. *G06T 2207/10016* (2013.01); *G08B 13/19656* (2013.01); *G09B 5/065* (2013.01); *H04N 7/181* (2013.01)

(58) Field of Classification Search
CPC .... G11B 27/3081; G11B 27/02; G11B 31/006
USPC ................ 386/223, 230; 348/211.3; 434/308
See application file for complete search history.

(56) References Cited

U.S. PATENT DOCUMENTS 9,189,070 B2 * 11/2015 Yamaguchi ........... G06F 3/0485
2015/0010287 A1 * 1/2015 Eriguchi .............. H04N 9/8227
386/230

FOREIGN PATENT DOCUMENTS

JP    2017-92826    5/2017
JP    2017-139725   8/2017

OTHER PUBLICATIONS

Yasuda, Hiroyasu, "Aiming for 'democratization' of 3D-CG • VR—Interview with Amatelus Japan Corporation," online at //https://www.sumoviva.jp/trend-tips/20170630_1356_2.html, Jun. 30, 2017, two parts, printouts in English language (7 and 5 pages each) and Japanese language (6 and 5 pages each).

"WEB movie 'SwipeVideo' that can experience viewing 360° free viewpoint image by swipe in the world for the first time Start demonstration experiment at local administrative region creation project," AMATELUS Japan Corporation, Aug. 31, 2017, 3 pages in English language and 3 pages in Japanese language.

* cited by examiner

VIDEO DISTRIBUTION DEVICE, VIDEO DISTRIBUTION SYSTEM, VIDEO DISTRIBUTION METHOD, AND VIDEO DISTRIBUTION PROGRAM

BACKGROUND

1. Technical Field

This disclosure relates to a video distribution device, a video distribution system, a video distribution method, and a video distribution program. In particular, the disclosure relates to a video distribution device, a video distribution system, a video distribution method, and a video distribution program that use images shot by multiple cameras.

2. Background

A video distribution device that uses images shot by multiple cameras has been developed. For example, Japanese Unexamined Patent Application Publication No. 2015-177394 (JP 2015-177394 A) discloses, among multiple cameras with different points of views for the same subject, the arrangement states of a group of cameras specified by the user are set as reference in advance, the point of view of the subject is changed, one, two, or more of the other cameras to shoot the images to be used to generate a series of combined moving images are designated as a group with the group of the cameras specified by the user, and the moving images shot by the cameras in the designated group are switched at predetermined switching time intervals and combined to generate a series of combined moving images. The series of combined moving images are generated by determining the order of combining the moving images.

Also, Japanese Unexamined Patent Application Publication No. 2004-53616 (JP 2004-53616 A) discloses an imaging system that arranges multiple imaging devices in a three-dimensional space to shoot multiple videos of an object, and distributes signals of moving images of the subject sent from the multiple cameras to a recording device in which the point of view is changed.

Disclosures of JP 2015-177394 A and JP 2004-53616 A have a problem in that the amount of data becomes heavier to combine videos shot by the designated cameras among the multiple cameras each time the videos are shot, and thus the direction in which the user desires to view the subject fails to be designated.

It could therefore be helpful to display a subject at various angles smoothly in the direction in which the user desires to view the subject by a simple operation through an information processing terminal.

SUMMARY

We therefore provide:

A video distribution device including an acquisition unit for acquiring multiple videos of the same object shot from different angles; a storage unit for associating a still image for a predetermined duration of time extracted from each of the multiple videos with information indicating an angle at which the corresponding video is shot, and storing the associated still image in a chronological order; a reception unit for receiving an angle for viewing the object designated via an information processing terminal; and a control unit for performing a control in which each time the reception unit receives the designated angle, a still image corresponding to the angle is obtained from the storage unit, and the still image corresponding to the angle is transmitted to the information processing terminal in the chronological order where the still image is stored.

The video distribution device may further include a provision unit for providing a web page for providing the video. The control unit may transmit the still image to be displayed on the web page, and transmit the web page in which contents of sequential still images are changed in the chronological order to provide the information processing terminal with a pseudo video.

The video distribution device may further include: a generation unit for extracting a frame for each of the multiple videos acquired by the acquisition unit for a predetermined time, converting the frame into a format of a hypertext markup language HTML as the still image, generating HTML data to be stored in the storage unit in which the angle is associated with time in which the video is shot. The control unit may transmit the HTML data generated by the generation unit and stored in the storage unit as the still image.

In the video distribution device, the acquisition unit may acquire videos of the object shot by mobile terminals having multiple recording functions from different angles.

A video distribution system includes: an imaging unit for imaging multiple videos of the same object from different angles; a server including a storage unit for associating a still image for a predetermined duration of time extracted from each of the imaged multiple videos with information indicating an angle at which the corresponding video is imaged, and storing the associated still image in a chronological order; and an information processing terminal for receiving a designation of an angle for viewing the object by a user sliding a finger on an operation screen in a state where the finger is in contact with the screen. The server includes a reception unit for receiving the designation of the angle for viewing the object via the information processing terminal, and each time the reception unit receives the designation of the angle, a still image corresponding to the angle is obtained from the storage unit, and the still image corresponding to the angle is displayed on the information processing terminal.

A video distribution method causes a computer to execute the steps of: acquiring multiple videos of the same object from different angles; associating a still image for a predetermined duration of time extracted from each of the multiple videos with information indicating an angle at which the corresponding video is shot, and storing the associated still image in a chronological order; receiving an angle for viewing the object designated via an information processing terminal; and performing a control in which each time the designated angle is received in the receiving step, a still image corresponding to the angle is obtained, and the still image corresponding to the angle is transmitted to the information processing terminal in the chronological order where the still image is stored.

A non-transitory computer readable medium storing a program causes a computer to execute the steps of: acquiring multiple videos of the same object from different angles; associating a still image for a predetermined duration of time extracted from each of the multiple videos with information indicating an angle at which the corresponding video is shot, and storing the associated still image in a chronological order; receiving an angle for viewing the object designated via an information processing terminal; and performing a control in which each time the designated angle is received in the receiving step, a still image corresponding to the angle stored in the storing step is obtained, and the still image corresponding to the angle is transmitted to the information processing terminal in the chronological order where the still image is stored.

Designation of the angle for viewing the object is received from the information processing terminal, and each time the designation of the angle is received, the still image corresponding to the angle is obtained and transmitted to the information processing terminal in the chronological order in which the still image corresponding to the angle is stored. This simple operation for the information processing terminal achieves an advantage in that the subject is displayed in various angles in any direction in which the user desires to view the subject.

BRIEF DESCRIPTION OF THE DRAWINGS

Features, advantages, and technical and industrial significance of examples of the disclosure will be described below with reference to the accompanying drawings, in which like numerals denote like elements.

DETAILED DESCRIPTION

With reference to the drawings, examples will be described below.

Figure 1:
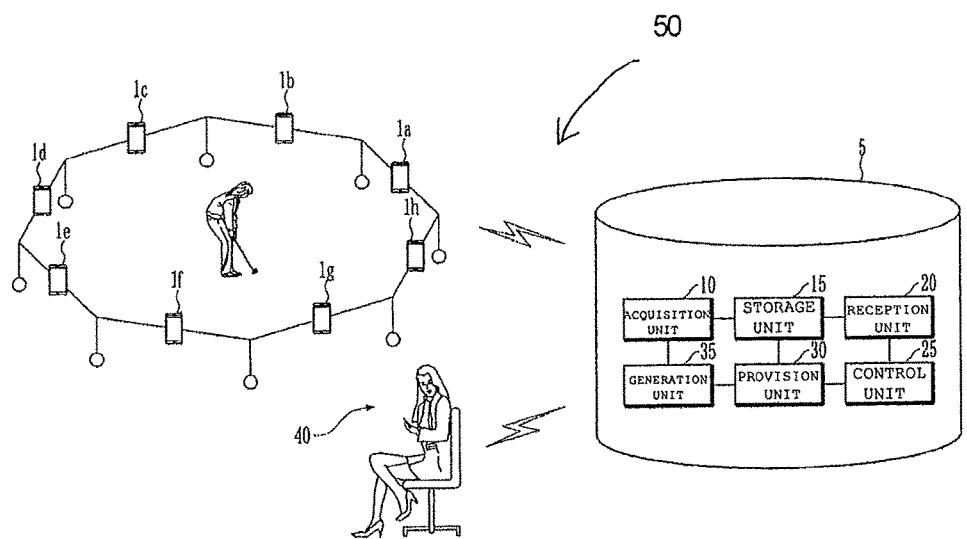
FIG. 1 is a diagram illustrating a configuration example of a video distribution system according to an example.

FIG. 1 is a diagram illustrating a configuration example of a video distribution system 50. As shown in FIG. 1, the video distribution system includes a video distribution device 5 connected to mobile terminals 1*a* to 1*h* and/or an information processing terminal 40 via the network.

The video distribution device 5 includes: an acquisition unit 10 for acquiring multiple videos of the same object shot from different angles; a storage unit 15 that associates a still image for a predetermined duration of time extracted from each of the multiple videos with information indicating an angle at which the corresponding video is shot, and storing the associated still image in a chronological order; a reception unit 20 that receives an angle for viewing the object designated via the information processing terminal 40; and a control unit 25 for performing a control in which each time the reception unit 20 receives the designated angle, a still image corresponding to the angle is obtained from the storage unit 15, and the still image corresponding to the angle is transmitted to the information processing terminal 40 in the chronological order in which the still image is stored.

The video distribution device 5 may further include a provision unit 30 that provides a web page for providing videos. The control unit 25 may transmit the still image to be displayed on the web page, and transmit the web page in which contents of sequential still images are changed in the chronological order to provide the information processing terminal 40 with a pseudo video.

The video distribution device 5 may further include a generation unit 35 for extracting a frame for each of the multiple videos acquired by the acquisition unit 10 for a predetermined time, converting the frame into a format of a hypertext markup language HTML as the still image, generating HTML data to be stored in the storage unit 15 in which the angle is associated with time in which the video is shot. The control unit 25 may transmit the HTML data generated by the generation unit 35 and stored in the storage unit 15 as the still image.

The video distribution device 5 may be configured such that the acquisition unit 10 acquires videos of the object shot by the mobile terminals 1*a* to 1*h* having multiple recording functions from different angles. The imaging unit described later is a camera having, for example, a CCD or a CMOS that obtains image data. One such example may include a mobile terminal 1, but it may include a single-lens reflex camera or a digital camera. The imaging unit performs barrett time shooting in which the subject is surrounded by multiple mobile terminals. The barrett time shooting is to arrange multiple cameras around the subject, and shoot the subject continuously by the cameras in the order in the direction in which the angle at which the subject is shot is desired to be moved. The barrett time shooting refers to a technology or an effect that shows a movement of the subject in slow motion by image processing, and in which videos are shot by a camera work moved at high speed. The video distribution device 5 includes an image processing unit (not shown) for variable speed reproduction. The image processing unit performs slow-motion reproduction and high-speed reproduction, for example.

The imaging unit is a camera having a CCD or a CMOS, for example. One example of the imaging unit may include a mobile terminal 1, but it may be a single-lens reflex camera or a digital camera, for example. The imaging unit of the video distribution system 1 uses multiple mobile terminals 1 so that an amount of data becomes enormous depending on the number of the mobile terminals 1 used. This achieves an advantage in that the amount of data psychologically and physically prevents illegal download.

A video distribution system 50 includes: an imaging unit that images multiple videos of the same object from different angles; a server including a storage unit 15 that associates a still image for a predetermined duration of time extracted from each of the imaged multiple videos with information indicating an angle at which the corresponding video is imaged, and storing the associated still image in a chronological order; and an information processing terminal 40 that receives a designation of an angle for viewing the object by a user sliding a finger on an operation screen in a state where the finger is in contact with the screen. The server includes a reception unit 20 that receives the designation of the angle for viewing the object via the information processing terminal 40, and each time the reception unit 20 receives the designation of the angle, a still image corresponding to the angle is obtained from the storage unit 15, and the still image corresponding to the angle is displayed on the information processing terminal 40.

The video distribution device 5 includes an acquisition unit 10, a storage unit 15, a reception unit 20, a control unit 25, a provision unit 30, and a generation unit 35.

The video distribution device 5 corresponds to a device that connects to the information processing terminal 40 via the network and providing services of the video distribution system to the information processing terminal 40. The video distribution device 5 may include, for example, a server device or a computer (such as a desktop, a laptop, and a tablet, for example). For the network, any of various communication methods including wireless LAN, (such as Wi-Fi, 3G, LTE, Bluetooth (registered trademark)), may be used.

The acquisition unit 10 acquires the image or video obtained from the imaging unit. Specifically, as shown in FIG. 1, the multiple mobile terminals 1 acquire multiple videos imaged from different angles to surround the subject. The storage unit 15 stores the videos shot by the imaging units.

The storage unit 15 stores various information in the video distribution device 5. The storage unit 15 also serves to store various programs and data needed for the video distribution device 50 to operate. The storage unit 15 may be various recoding media such as a hard disc drive (HDD), a solid state drive (SSD), and flash memory, for example.

Figure 3:
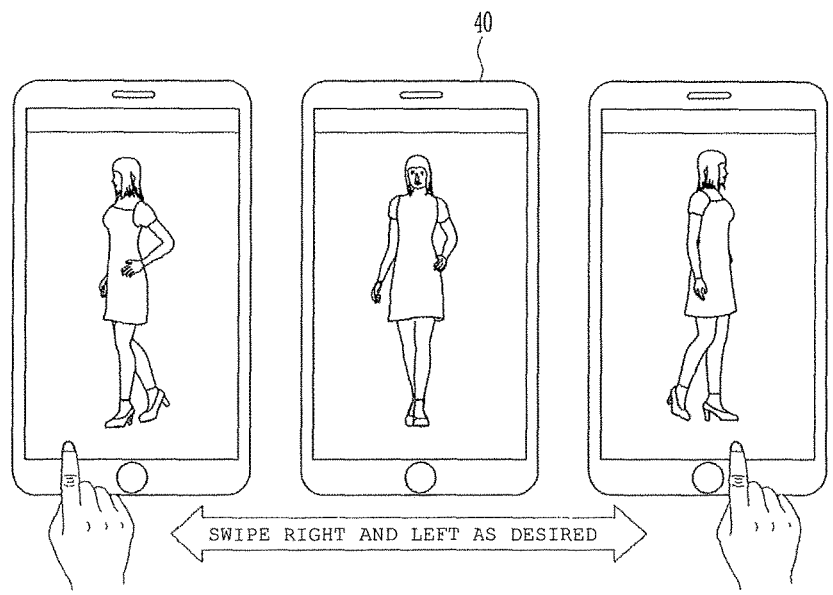
FIG. 3 is a pattern diagram illustrating an example of screens of an information processing terminal.

The reception unit 20 receives various information transmitted from the information processing terminal 40. Specifically, as shown in FIG. 3, the user instructs the reception unit 20 whether he/she desires to see the right side of the subject or the left side of the subject by a screen operation such as swiping, i.e., operation of sliding his/her finger on the screen of the information processing terminal 40 in the state where the finger is in contact with the screen so that the reception unit 20 receives a designation of the angle for viewing the subject as an object to be viewed among the angles of the mobile terminals 1a to 1h.

The control unit 25 is a processor that serves to control each part of the video distribution device 5. For example, the control unit 25 may include a central processing unit, a microprocessor, a processor core, a multiprocessor, an application-specific integrated circuit (ASIC), and a field programmable gate array (FPGA). In the present disclosure, the control unit 25 is not limited to these.

The provision unit 30 provides the information processing terminal 40 with videos or still-image based videos. Specifically, the provision unit 30 provides the information processing terminal 40 with a web page for providing videos.

The generation unit 35 provides the information processing terminal 40 with videos or still-image based videos. Specifically, the provision unit 40 provides the information processing terminal 40 with a web page for providing videos. As shown in FIG. 3, for the web page, a web page is provided to allow the user to view the subject in the direction in which the user desires to view on the screen of the information processing terminal 40.

Figure 2:
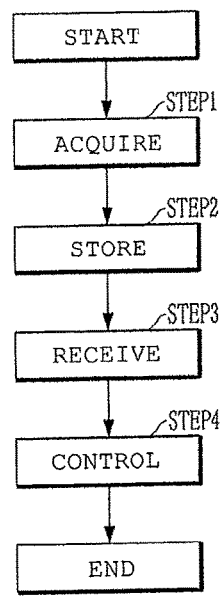
FIG. 2 is a flowchart illustrating an operation example of a video distribution device.

FIG. 2 is a flowchart illustrating an operation example of a video support system 1 according to a first example.

The process procedure of the video support system 50 is described with reference to the flow of the flowchart in FIG. 2. The acquisition unit 10 obtains multiple videos of the same object as a subject shot by multiple mobile terminals 1 from different angles (step S1).

The storage unit 15 associates a still image for a predetermined duration of time extracted from each of the multiple videos with information indicating an angle at which the corresponding video is shot, and stores the associated still image in a chronological order (step S2). The storage unit 15 stores which mobile terminal the video is shot, and shooting time information such as what time, what minute, and what second the multiple still images configuring the video are shot. The shooting time information may be recorded by using a clock function built in the camera, or the shooting time information may be recorded by the calculation using the clock function built in the video distribution device 5 or the information of the shooting timing of the video.

The storage unit 15 also stores HTML data which will be described below.

The generation unit 35 extracts frames of each of the multiple videos for a predetermined time acquired by the acquisition unit 10, converts them into an HTML format as still images, and generates HTML data to be stored in the storage unit 15 in which the angle is associated with the imaged time.

Figure 4:
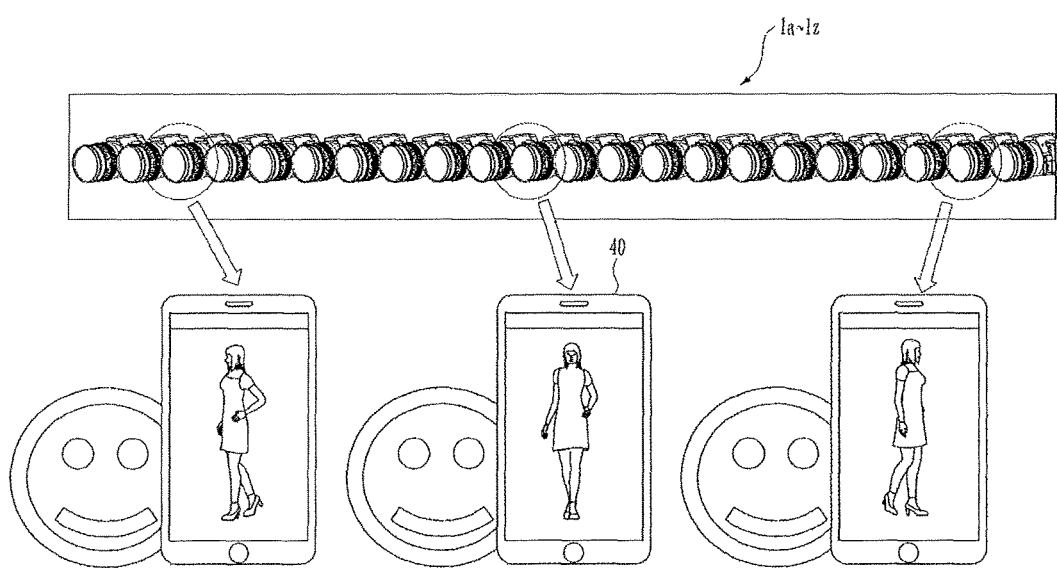
FIG. 4 is a pattern diagram illustrating a relationship between multiple mobile terminals and information processing terminals.

The reception unit 20 receives various information transmitted from the information processing terminal 40 (step S3). For example, as shown in FIG. 4, the user instructs the reception unit 20 whether he/she desires to see the right side of the subject or the left side of the subject by a screen operation such as swiping, i.e., operation of sliding his/her finger on the screen of the information processing terminal 40 in the state where the finger is in contact with the screen so that the reception unit 20 receives a designation of the angle for viewing the subject as an object to be viewed among the angles of the mobile terminals 1a to 1h. Each time the user swipes the information processing terminal 40, he/she accesses the HTML data as the still images at the same time in the video shot by the mobile terminal on the side to which the user swipes the screen. The user may also access the HTML data as the still images at the same time in the video shot by the mobile terminal on the side opposite to the side to which the user swipes the screen. As shown in FIG. 4, only a video of the single imaging unit is individually distributed from the cloud according to the swipe on the screen of the information processing terminal 40, achieving a constant view even in the state where the communication speed is limited at the end of the month. The videos are converted into HTML data, saving waste of the received data accepted by the information processing terminal 40. This achieves a higher resolution than that of a normal 360-degree video.

Each time the reception unit 20 receives the designation of the angle, the control unit 25 obtains a still image corresponding to the angle from the storage unit 15, and transmits the still image corresponding to the angle to the information processing terminal 40 in the chronological order in which the still image is stored (step S4). For example, each time the reception unit 20 receives the designation of the angle by the user swiping the information processing terminal 40, the reception unit 20 obtains a still image corresponding to the angle from the storage unit 15, and transmits HTML image as the still image corresponding to the angle to the information processing terminal 40 in a chronological order. The control unit 25 transmits the still image to be displayed on the web page, and transmits the accessed web page in which contents of sequential still images are changed in the chronological order to provide the information processing terminal 40 with a pseudo video.

In the video distribution system 50, the object to be imaged by the imaging unit may be a human other than that playing a sport as shown in FIG. 1, or an animal. For example, the object may include an entertainer or a singer. Although the video distribution system 50 may be employed for landscape, it may be basically suitable for a human, an animal, and an object. The video distribution system 50 provides a pseudo video such as 360-degree video. According to the needs that a user desires to view the video, HTML data is used to maintain the constant resolution of the image and reduce the communication traffic volume.

Also, the video distribution system 50 allows the user to enjoy viewing the subject as the object to be shot at any angle by swiping the screen to right and left as much as the user desires as shown in FIGS. 3 and 4. In the information processing terminal 40, the user may designate other angles not only by swiping the screen but also by the trajectory of the finger.

The designation of the angle for viewing the object is received from the information processing terminal, and each time the designation of the angle is received, the still image corresponding to the angle is obtained and transmitted to the information processing terminal in the chronological order in which the still image corresponding to the angle is stored. This simple operation for the information processing terminal achieves an advantage in that the subject is displayed in various angles in any direction in which the user desires to view the subject.

The video distribution device 50 further includes a generation unit that extracts a frame for each of the multiple videos acquired by the acquisition unit for a predetermined time, converting the frame into a format of a hypertext markup language HTML as the still image, generating HTML data to be stored in the storage unit in which the angle is associated with time in which the video is shot. The control unit transmits the HTML data generated by the generation unit and stored in the storage unit as the still image. This achieves an advantage in that the pseudo video viewed through the information processing terminal has a high resolution, and the data communication traffic volume is reduced.

In the video distribution system 50, except when the user swipes the screen, the information processing terminal 40 plays the video shot by the single mobile terminal. When the user swipes the screen, the information processing terminal 40 displays the still image shot by the other mobile terminal, and then plays the video. The information processing terminal 40 is driven only to play the video, achieving an advantage in that the battery consumption is reduced compared to when the 360 degree videos and the pseudo 3d videos are played.

The functional units of the video distribution system 50 may be embodied by a logic circuit (hardware) or a dedicated circuit provided in an integrated circuit (IC) chip or a large scale integration (LSI), or by software using a central processing unit (CPU) and a memory. Also, each functional unit may be embodied by one or more integrated circuits, and the functions of multiple functional units may be embodied by a single integrated circuit. The LSI may be referred to as VLSI, super LSI, and ultra LSI depending on the difference in density. FIG. 11 shows an example in which functional units of the server 100 and the user terminal 200 are illustrated by a circuit. The term circuit may include meanings such as digital processing by computers, i.e., functional processing by software. Also, the circuit may be embodied by a reconstructable circuit (e.g., a field programmable gate array FPGA).

The invention claimed is:

1. A video distribution system comprising:
    a plurality of mobile terminals including a plurality of imaging units arranged to surround a subject, wherein the imaging units include cameras that image the subject from a plurality of different angles, and a recording function that records multiple videos obtained through imaging, and the imaging units transmit the recorded videos to a wireless network;
    a server including:
        an acquisition unit that acquires the multiple videos from the mobile terminals through the wireless network, the multiple videos being obtained by the mobile terminals configured by the imaging units imaging the subject;
        a generation unit that extracts a frame for each of the multiple videos acquired by the acquisition unit through the wireless network for a predetermined time, converts the frame into a format of a hypertext markup language HTML as a still image, and generates HTML data where an angle at which each video is imaged is associated with time in which the video is imaged; and
        a storage unit that stores the HTML data in a chronological order; and
    an information processing terminal that receives a designation of an angle for viewing the subject by a user sliding a finger on a screen in a state where the finger is in contact with the screen to perform a swiping operation on the screen, wherein
    the server further includes:
        a reception unit that receives the designation of the angle for viewing the object subject via the information processing terminal; and
        a control unit configured such that:
            during the swiping operation, each time the reception unit sequentially receives the designation of the angle that changes based on the swiping operation, the control unit performs a control such that the HTML data of the still image corresponding to the angle is obtained from the storage unit, and transmitted through the wireless network to the information processing terminal, and
            after the swiping operation is completed, the control unit performs a control such that the HTML data of the still image corresponding to the angle at a time after the swiping operation is completed is transmitted through the wireless network to the information processing terminal in a chronological order in which the HTML data is stored,
    during the swiping operation, the information processing terminal displays, by the HTML data received from the server, the still image of the subject corresponding to the angle that changes based on the swiping operation, and
    after the swiping operation is completed, the information processing terminal sequentially receives and displays the HTML data of the still image at an angle corresponding to a position at which the swiping operation is completed to display a pseudo video at the angle corresponding to the position at which the swiping operation is completed.

2. The video distribution system according to claim 1, further comprising a provision unit that provides a web page to provide the video, wherein
    the control unit transmits the still image to be displayed on the web page, and transmits the web page in which contents of sequential still images are changed in the chronological order to provide the information processing terminal with the pseudo video.

* * * * *